United States Patent [19]
Adam et al.

[11] Patent Number: 5,211,781
[45] Date of Patent: May 18, 1993

[54] TIRE TREAD FOR LARGE MOTOR VEHICLES

[75] Inventors: Georges V. Adam, Bissen; Georges G. Feider, Petange; Michel Premont, Boevange/Attert, all of Luxembourg; Daniel Scheuren, Hachy, Belgium

[73] Assignee: The Goodyear Tire & Rubber Company, Akron, Ohio

[21] Appl. No.: 793,898

[22] Filed: Nov. 18, 1991

[30] Foreign Application Priority Data

Sep. 5, 1990 [EP] European Pat. Off. ............ 90630149

[51] Int. Cl.$^5$ ............................................. B60C 11/12
[52] U.S. Cl. ........................... 152/209 R; 152/DIG. 3
[58] Field of Search .......... 152/209 R, 209 D, 209 A, 152/DIG. 3; D12/141-143, 145

[56] References Cited

U.S. PATENT DOCUMENTS

D. 218,215 7/1970 Wittenmyer .................. D12/143
D. 222,319 10/1971 Blankenship .................. D12/142
D. 230,532 2/1974 Stell a ........................... D12/141
4,449,560 5/1984 Tansei et al. ................. 152/209 R
5,097,882 3/1992 Adam et al. ................. 152/209 R

FOREIGN PATENT DOCUMENTS 0351349 1/1990 European Pat. Off. ........ 152/209 R

Primary Examiner—Michael W. Ball
Assistant Examiner—Nancy T. Krawczyk
Attorney, Agent, or Firm—T. P. Lewandowski

[57] ABSTRACT

A tire tread (20) comprises four circumferentially extending grooves (1-4) dividing the tread into five continuous ribs (10-14) of elastomeric material. The edges of the grooves, which separate the different ribs from each other are constituted by zig-zag shaped repetitive design units (5-8;35-38). The repetitive design units on either side of the grooves (1-4) extend in circumferentially opposite directions and have each four legs, a first (5;35) and third (7;37) short leg alternating with a second (6;36) and fourth (8;38) long leg. The ribs include series of deep (40-42, 43-45) and shallow (50-52, 53-55) sipes as well as deep (48, 49) cuts.

8 Claims, 3 Drawing Sheets

TIRE TREAD FOR LARGE MOTOR VEHICLES

The present invention relates generally to tire treads and more specifically to treads for pneumatic tires intended for use on steering axles of large motor vehicles.

The tires employed on large motor vehicles, such as trucks, buses or over the road tractor-trailer rigs, present challenges to a tire engineer having regard to low and even wear, traction, wet grip, handling, noise emission and fuel economy. If the tires are mounted on free rolling axles they tend to exhibit non-uniform wear patterns, especially if the tire tread has a block type design and if the vehicle travels mostly on high-ways. If the tires are mounted on driven axles, good traction properties should be dominating. If the tires are mounted on steering axles, precise steering response, excellent handling and side stability are required.

A tread for a tire in a steering position of a large motor vehicle is known from European patent application No. 0 351 349.

An aim of the invention is to create a tire tread structure having outstanding properties in a non-driven steering position and which will perform quite adequately when employed in either a driven position or a on a follower axle of large motor vehicles.

A further aim of the invention is to provide a pneumatic tire having a low noise emission.

A still further aim of the invention is to provide a pneumatic tire behaving in a uniform manner, irrespective of the road surface conditions.

These aims are met by the tire tread as described in the appended claims.

To acquaint persons skilled in the art most closely related to the instant invention, certain preferred embodiments are now described with reference to the annexed drawings. These embodiments are illustrative and can be modified in numerous ways within the spirit and scope of the invention defined in the claims.

For the purpose of this invention, a pneumatic radial tire shall be considered a tire wherein the cords of the carcass reinforcement which extend from bead to bead are laid at cord angles between 70° and 90° with respect to the equatorial plane (EP) of the tire. As used herein and in the claims, an "equatorial plane" means a plane perpendicular to a tire's axis of rotation and passing through the center of its tread, midway between the sidewalls of the tire. The terms "radial" and "radially" are understood to refer to directions that are perpendicular to the axis of rotation of a tire, the terms "axial" and "axially" are used herein to refer to lines or directions that are parallel to the axis of rotation of a tire and the terms "lateral" and "laterally" are understood to refer to directions going from one sidewall of a tire towards the other sidewall of a tire.

"Groove" means an elongated void area in a tread that may extend circumferentially or laterally in the tread in a straight, curved, saw-tooth or zig-zag manner. The grooves are subclassified as "wide" or "sipe". A "wide" groove has a width greater than 3% of the tread width whereas a "sipe" is a groove having a width in the range from about 0.15% to 1% of the tread width. Sipes can have a depth equal to, smaller or greater than the radial depth of the neighboring grooves; their depth may also change, either gradually or step wise. Sipes are typically formed by 0.2 to 1 mm thick steel blades inserted into a cast or machined mold; inasmuch as sipes are so narrow, they are illustrated by single lines. "Tread width" (TW) is defined as the greatest axial distance across a tread, when measured from a footprint of a tire, when mounted on the design rim and subjected to a specified load and when inflated to a specified inflation pressure for said load. Axial widths and other widths of other tread features or components are measured under the same condition as the tread width. The groove widths are measured perpendicular to the centerline of the groove. For any given tire the design rim, inflation and load may be determined from the *YEARBOOK OF THE EUROPEAN TIRE AND RIM TECHNICAL ORGANIZATION* or the *YEARBOOK OF THE TIRE & RIM ASSOCIATION* for the year in which the tire is manufactured.

It is to be understood that the invention applies to new tires, to retreaded tires as well as to tire treads in ring or strip form, being at least partly vulcanized and having a pattern of grooves and raised elements integral therewith: the length of the tire tread is not to be considered a limiting factor for the practice of all aspects of the invention. The elastomeric material comprised in the tread may include natural rubber, synthetic rubber, a blend of the two, or any suitable material.

Figure 1:
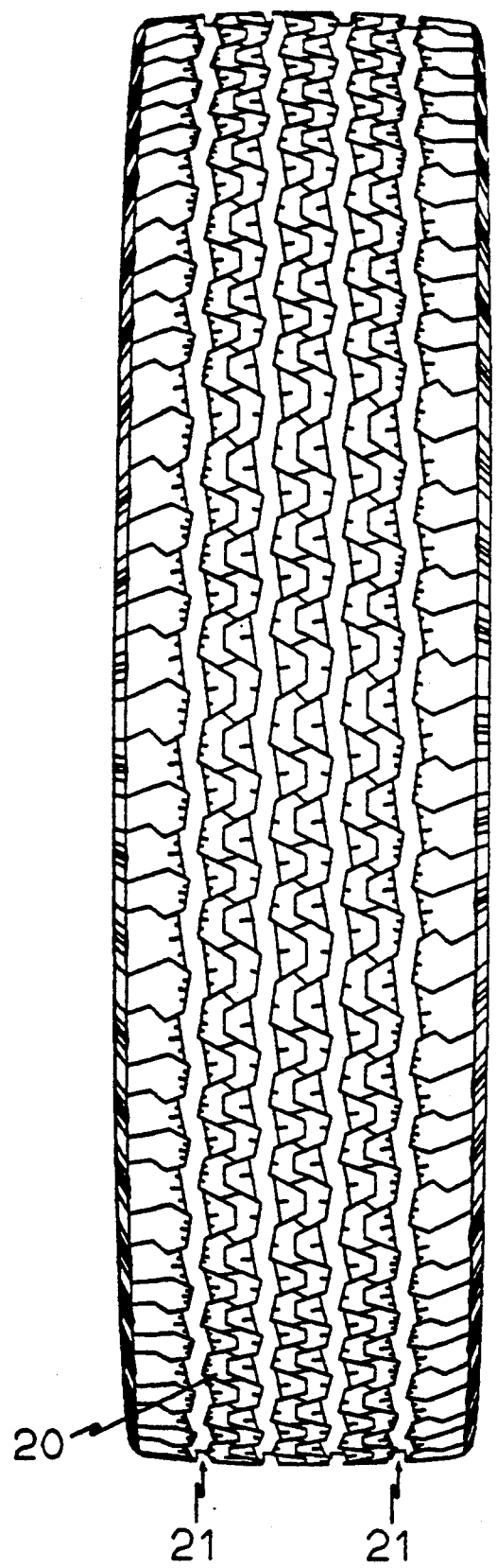
FIG. 1 is a front view of a tire embodying a tread made in accordance with the present invention.
Figure 2:
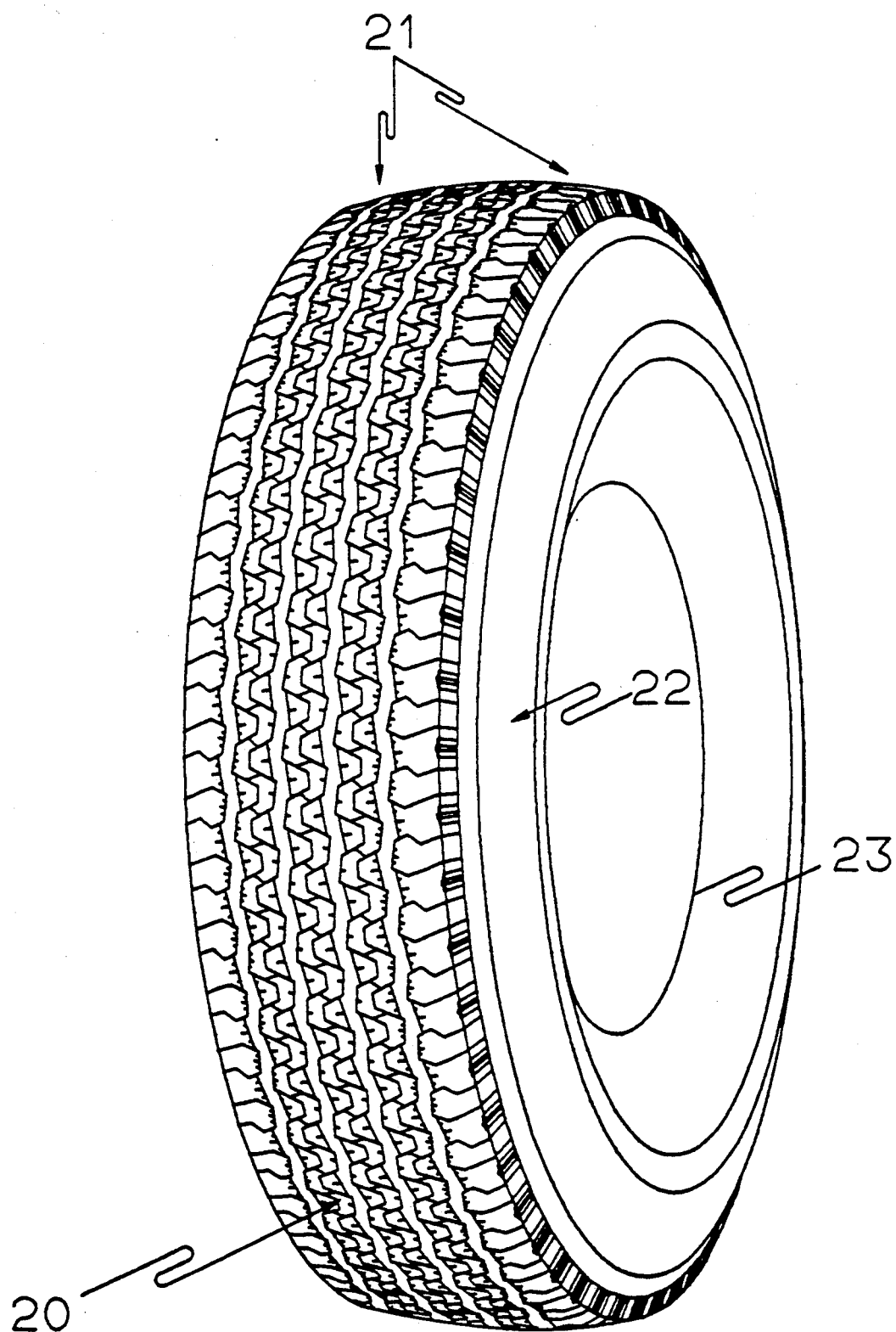
FIG. 2 is a perspective view of the tire shown in FIG. 1.

With reference to FIGS. 1 and 2, there is illustrated a pneumatic tire of the radial carcass type, having a ground contacting tread 20. The tread is flanked by a pair of shoulders 21 which are in turn joined to a pair of sidewalls 22 that extend radially inwardly from the tread and each terminates in a bead 23.

Figure 3:
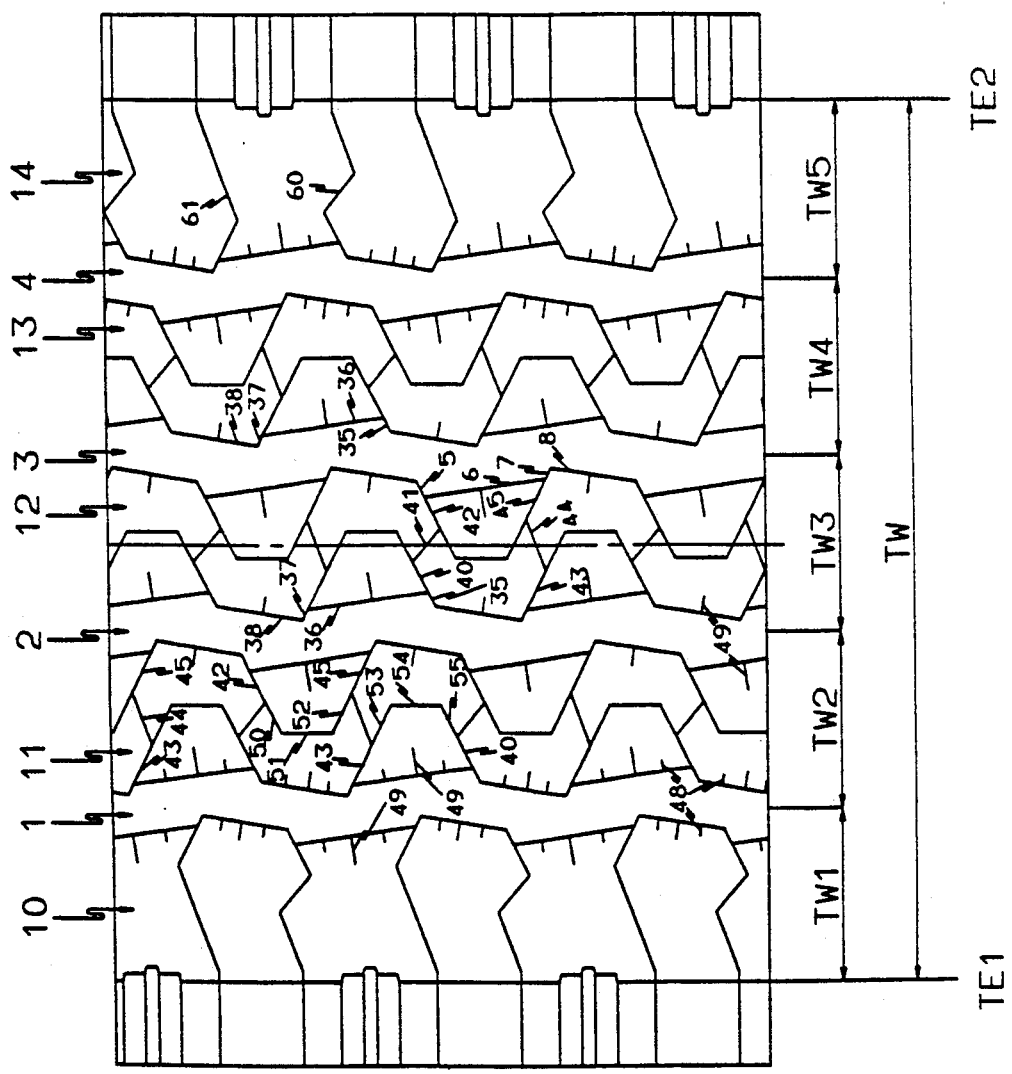
FIG. 3 is an enlarged fragmentary front view of a portion of the tread of FIG. 1.

Referring now more specifically to FIG. 3, there is shown an enlarged fragmentary view of a portion of the tread of FIG. 1. Four axially spaced, circumferentially extending wide grooves 1-4 divide the tread into five continuous ribs of elastomeric material: two shoulder ribs 10,14, two intermediate ribs 11,13 and one central rib 12. By "continuous" is meant that the ribs can include sipes, but that these sipes have to close in the footprint of the tire so as to have each rib behave as being at least partly constituted by a homogeneous mass of elastomeric material. Further details about the properties and the behavior of such a rib can be found in commonly owned UK patent No. 2 051 694. Though the tread represented in the figures comprises five ribs, the invention can equally be implemented with a tread having for instance four or six ribs.

As measured in a tire footprint, the axial widths TW1-TW5 of the central, intermediate and shoulder ribs range from 15 to 25% of the tread width TW. In the preferred embodiment shown, the axial widths TW1-TW5 are substantially equal. The above axial widths are delimited by the axial mean position of the centerline of the bordering circumferentially extending grooves 1-4.

The edges of the grooves 1-4, which separate the different ribs from each other, are zig-zag shaped. The repetitive design unit of zig-zags on either side of each of the grooves 1-4 has four legs 5-8: 35-38, a first and third short leg (5,7; 35,37) alternating with a second and fourth long leg (6,8: 36,38), the ratio of long leg to short leg length being below 15, and preferably below 8. The first, second, third, and fourth leg are inclined with respect to the equatorial plane by angles ranging respectively between 50° to 70°, 0° to −15°, −50° to −70° and 0° to 15°, angles of about 60°, −8°, −60°, and 10° being preferred. It is to be understood that the lengths and inclinations of the different legs depend on the pitch variation, as is practiced in the industry for tire noise reduction.

Though the repetitive design units of zig-zags on the facing sides of the grooves have substantially the same length and ratio of lengths of the long to short legs and though the different legs have the same inclinations with respect to the equatorial plane, the design units forming the two facing edges of the same groove extend in circumferentially opposite directions. Put in other words, the facing edges of a groove are symmetric with respect to a point lying on the centerline of this groove; in the represented embodiment this point is situated about halfway between the first leg 5; 35 of each design unit.

The central and intermediate ribs are provided with two alternating series of deep sipes 40–42; 43–45, having a depth comprised between 60% and 100%, preferably about 75% of the circumferentially extending grooves' radial depth, and two alternating series of shallow sipes 50–52; 53–55, having a depth comprised between 15% and 70%, preferably about 20% of the circumferentially extending grooves' depth.

The first 40–42 and second 43–45 series of deep sipes have each three laterally extending portions of about equal length; the first 42; 45 and third 40; 43 portions are respectively in the continuation of the axially closest first legs 5; 7 and third legs 35; 37 of the design units delimiting the rib sides. The second or intermediate portions 41; 44 form with the equatorial plane angles ranging between and 50° to 90°, while those of the first and third portions range between 30° and 70°.

The third 50–52 and fourth 53–55 series of shallow sipes have also each three portions, the second or intermediate portions 51; 54 forming with the equatorial plane an angle below 20°. The first 50; 53 and third 52; 55 portions are respectively situated in the continuation of the first 42; 43 and third portion 45; 40 of the deep sipes.

The shoulder ribs 10, 14 are also provided with laterally extending zig-zag shaped sipes 60, 61 having a variable depth. The axially innermost part of these sipes have depths of about 75% of the grooves' depth, whereas the axially outermost part, having an axial width ranging between 30% and 70of the axial width TW1, TW5 of the shoulder ribs 10, 14, have depths of about 20% of the grooves' depth. The first portion of each of these sipes is in the continuation of the short legs 5,7: 35,37 delimiting the circumferentially extending grooves 1, 2 on the axially outwardly side. It is believed that these shallow sipes have a minor technical effect and that their presence is not essential to implement the invention.

Corresponding legs of design units delimiting neighboring grooves and ribs are circumferentially offset. In the represented embodiment the offset of the ribs has been chosen so as to minimize the total noise emitted by the ribs when entering into the footprint of the tire; the staggered outlay of the ribs results also in low wear as well as in reduced heel and toe wear. Furthermore the indentations formed by each third 7; 37 and fourth 8; 38 leg protruding alternatively into the grooves from either side of the ribs, confer to the tire an outstanding grip on snow and ice covered roads. The offset of the ribs optimizes also the water evacuation capacity of the grooves; the grooves having a variable cross section, any other offset of the ribs results in a smaller cross-section at some point of the grooves.

In the represented embodiment of the invention, the long legs 6,8; 36,38 of the repetitive design units bordering all the grooves' 1–4, have been provided each with one broad length cut 49, extending substantially perpendicular from the grooves' edges into the elastomeric mass of the ribs 10–14 and having depths of about 90% of the grooves' depth. The long legs 6,8: 36,38 of the repetitive design units bordering the axially outermost grooves 1 and 4, have also been given at least one narrow length cut 48. The narrow length cuts 48 may also have a depth of about 90% of the neighboring groove's depth. The broad and the narrow cuts reduce the so-called river wear of the tread pattern.

The grooves are arranged on the tread, so that the total area of grooves to the total area of interposed ribs is substantially equal on each side of the equatorial plane and the net to gross i.e. the area of the rib portions to total tread area, ranges between 65% and 80%. In this particular embodiment, the net to gross is equal to about 75%.

Example: A steel belted radial carcass tire of size 315/80 R 22.5 has a tread width of about 240 mm and the five ribs have axial widths TW1–TW5 of about 48 mm. The pitch ratios are 19, 21 and 24 and the tread includes 56 circumferentially spaced pitches.

The grooves have radial depths of about 15 mm and widths range between 11 and 16 mm, depending on the circumferential position of the groove portion under consideration.

The sipes are located and oriented as shown on FIG. 3. The radial depth of the deep sipes in the center and intermediate ribs is substantially equal to 75% and the radial depth of the shallow sipes is substantially equal to 20% of the radial depth of the grooves. The axially innermost part of the sipes in the shoulder ribs have depths of about 75% of the grooves' depth, and the axially outermost part, having an axial width of about 60% of the axial width of the shoulder ribs have depths of about 20% of the grooves' depth. The radial depth of the broad and narrow cuts is substantially equal to 90% of radial depth of the grooves.

The two radially oriented carcass plies comprise steel reinforcement cords. The belt structure comprises four single cut plies, the radially innermost ply being a split ply. The superposed plies are reinforced by steel cords, which, starting from the innermost ply, form angles of about 67°, 21°, −19° and 21° with respect to the equatorial pane, the angles of the cords of the three radially outermost plies opposing each other.

The tread comprises an elastomeric compound having a modulus ranging between 12 and 17 MPa, a Shore A hardness ranging between 55 and 70 an elongation of about 400% and a tensile strength ranging between 18 and 28 MPa.

While certain representative embodiments have been described for the purpose of illustrating the invention, it will be apparent to those skilled in the art that various changes and modifications may be made therein without departing from the spirit or scope of the invention.

We claim:

1. A tire tread comprises an elastomeric substance extending circumferentially about the axis of rotation of the tire:

a pair of shoulders which flank the lateral edges of a ground engageable surface;

at least three circumferentially extending grooves dividing the tread into continuous ribs of elastomeric material, the edges of the grooves, which separate the different ribs from each other being constituted by zig-zag shaped repetitive design units, said repetitive design units on either side of the grooves extending in circumferentially opposite directions and each said repetitive design unit having four legs, a first and third short leg alternating with a second and forth long leg, said edges of the grooves forming boundaries for a repetitive series of two axially adjacent blocks;

a first and second alternating series of deep sipes in all the ribs with the exception of the shoulder ribs, the series each having three portions, the first and third portions being respectively in the continuation of the axially closest first legs and third legs of the design units which delimit opposing rib sides, the second or intermediate portions forming with the equatorial plane of the tire angles ranging between 50° to 90° while those of the first and third portions range between 30° to 70°, said first and second alternating series of sipes forming with the edges of the grooves the boundaries of the two axially adjacent blocks;

a third and fourth series of shallow sipes in all the ribs with the exception of the shoulder ribs, having each three portions, the second or intermediate portions forming with the equatorial plane an angle below 20°, the first and third portions being respectively situated in the continuation of said first and third portion of the deep sipes to form the parting line between the two axially adjacent blocks.

2. A tire tread according to claim 1 wherein the shoulder ribs are provided with laterally extending sipes having a zig-zag shape, the portion of each of these sipes which is axially centermost of the tread being in the continuation of the short legs delimiting the groves.

3. A tire tread according to claim 1 wherein the long legs of the repetitive design units bordering all the grooves, have been provided each with one broad length cut, extending substantially perpendicular from the groove edge into the elastomeric mass of the ribs and having a depth above 70% of the grooves' depth.

4. A tire tread according to claim 1 wherein the long legs of the repetitive design units bordering the axially outermost grooves, have been given at least one narrow length cut having a depth above 70% of the grooves' depth.

5. A tire tread according to claim 1 wherein the first, second, third, and fourth leg of the repetitive design units are respectively inclined with respect to the equatorial plane by angles ranging respectively between 50° to 70°, 0° to −15°, −50° to −70° and 0° to 15°.

6. A tire tread according to claim 1 wherein there are four circumferentially extending grooves dividing the tread into five continuous ribs of elastomeric material, the axial widths of the central, intermediate and shoulder ribs ranging from 15 to 25% of the tread width.

7. A tire tread according to claim 6 wherein the first, second, third and fourth leg of the repetitive design units are inclined with respect to the equatorial plane by angles of respectively about 60°, 8°, −60° and 10°.

8. A tire tread according to claim 6 wherein the total area of grooves to the total area of interposed ribs is substantially equal on each side of the equatorial plane and wherein the net to gross ranges between 65% and 80%.

* * * * *